United States Patent
Janke et al.

(10) Patent No.: US 7,520,719 B2
(45) Date of Patent: Apr. 21, 2009

(54) METHOD AND APPARATUS FOR THE COOLING OF THE OUTER SHROUDS OF THE ROTOR BLADES OF A GAS TURBINE

(75) Inventors: Erik Janke, Berlin (DE); Frank Haselbach, Stahnsdorf (DE); Christopher F. Whitney, Whetstone (GB)

(73) Assignees: Rolls-Royce Deutschland Ltd & Co KG, Blankenfelde-Mahlow (DE); ALSTOM Technology Ltd, Baden (CH)

( * ) Notice: Subject to any disclaimer, the term of this patent is extended or adjusted under 35 U.S.C. 154(b) by 192 days.

(21) Appl. No.: 11/272,862

(22) Filed: Nov. 15, 2005

(65) Prior Publication Data
US 2007/0110563 A1 May 17, 2007

(30) Foreign Application Priority Data
Nov. 15, 2004 (EP) .................................. 04090435

(51) Int. Cl.
*F03B 11/00* (2006.01)
(52) U.S. Cl. ....................... 415/176; 415/115; 415/178; 416/97 R
(58) Field of Classification Search ................. 415/115, 415/176, 178; 416/97 R
See application file for complete search history.

(56) References Cited

U.S. PATENT DOCUMENTS

| 3,314,648 | A | * | 4/1967 | Werner | ........................ 415/115 |
| 3,825,365 | A |   | 7/1974 | Peng | |
| 4,280,792 | A | * | 7/1981 | Hartel et al. | ................. 415/117 |
| 4,311,431 | A |   | 1/1982 | Barbeau | |
| 4,522,557 | A |   | 6/1985 | Bouiller et al. | |

FOREIGN PATENT DOCUMENTS

| EP | 0 959 230 A2 | 11/1999 |
| GB | 1 524 956 | 9/1978 |

* cited by examiner

Primary Examiner—Igor Kershteyn
(74) Attorney, Agent, or Firm—Timothy J. Klima

(57) ABSTRACT

Passive shroud cooling of rotor blades (5) is accomplished by a multitude of cooling-air flows introduced into the hot-gas flow upstream of the rotor blades on the outer circumference, these cooling-air flows, depending on the aerodynamic and geometrical conditions, being orientated at a defined radial angle and a circumferentially related tangential angle such that the cooling air primarily and essentially hits the thermally highly loaded bottom surface (11) of the outer shrouds (6) allover. In the apparatus for the performance of the method, cooling air passages (9) tangentially and radially orientated to the hot-gas flow are provided in an area of a casing section (3) which protrudes beyond the stator blades (1) in the downstream direction, this casing section (3) interrupting the transport of cooling air in the axial direction.

19 Claims, 1 Drawing Sheet

METHOD AND APPARATUS FOR THE COOLING OF THE OUTER SHROUDS OF THE ROTOR BLADES OF A GAS TURBINE

This application claims priority to European Patent Application EP 04 090 435.1 filed Nov. 15, 2004, the entirety of which is incorporated by reference herein.

BACKGROUND OF THE INVENTION

This invention relates to a method for the cooling of outer shrouds of rotor blades of a gas turbine which are subject to a hot-gas flow downstream of stator blades of the gas turbine and which are passively cooled with cooling air supplied via a turbine casing, as well as to an apparatus for the implementation of the method.

The efficiency of gas turbines can, as is generally known, be enhanced by increasing the turbine inlet temperature, which, however, is limited by the materials available for the stator and rotor blades of the high-pressure turbine. The turbine inlet temperature can, however, be increased if the cooling of the respective components is improved. As is generally known, the temperature of the disks, blades and platforms or shrouds, as applicable, is limited by active cooling using cooling air fed through inner ducts and partly by film cooling air fed-via-film cooling air holes to the outer surfaces.

Furthermore, in order to improve the cooling effect, the upper platforms or shrouds of the stator blades and the rotor blades are cooled passively, i.e. by means of compressor air supplied to these components from the outside. Passive cooling of the upper shrouds of the rotor blades is, however, inadequate in that the cooling air, which is supplied axially to the shrouds via an annular gap between the platforms of the stator blades and the turbine casing (e.g. the liner), primarily flows to the upper surface of the shrouds axially above the separation flow line of the hot-gas flow. This means that the cooling-air flows via the labyrinth seal provided between liner and shrouds, while the thermally highly loaded bottom surface of the shrouds is cooled only locally, while the thermally most loaded areas, such as the fillet radii between blade and shroud, can be missed entirely. The application of active cooling methods (internal cooling) to increase the cooling effect entails, on the one hand, considerable investment for the manufacture of shrouded rotor blades, and on the other hand, an increase in weight from the higher wall thicknesses required in such case. Passive cooling of the rotor blade shrouds can also be improved by substantially increasing the cooling air mass flow, however, with the disadvantage of high aerodynamic losses.

BRIEF SUMMARY OF THE INVENTION

The present invention, in a broad aspect, provides a method and an apparatus for the passive cooling of the outer shrouds of the rotor blades of an aircraft gas turbine such that intense and uniform cooling of the thermally highly loaded bottom surface of the rotor blade shrouds is obtained, while lowering the manufacturing effort and decreasing the cooling air mass flow and providing for correspondingly low aerodynamic losses.

It is a particular object of the present invention to provide a solution to the above problems by a cooling apparatus designed in accordance with the features described below. Further features and advantageous embodiments of the present invention will become apparent from the description herein.

In other words, it is the essence of the present invention that the transport of cooling air axially in the direction of the labyrinth seal is interrupted at the upper surface of the shrouds and that a multitude of individual cooling-air flows is directly introduced into the hot-gas flow already upstream of the rotor blades in a specific direction adjusted to the respective aerodynamic and geometric conditions, as a result of which the cooling air is primarily applied to the thermally highly loaded bottom surface of the outer shrouds facing the rotor blade, thus cooling this bottom surface essentially all over.

The angular position of the cooling-air flows to be introduced into the hot-gas flow is defined by a radial angle which, relative to the turbine casing, can range between 15° and 90° and a tangential angle which, in relation to the circumferential direction, can range between −85° and +85°.

The position of the cooling-air flows in the axial direction between the stator and the rotor, i.e. either closer to the stator or closer to the rotor, is also variable.

Important parameters for the position and orientation of the cooling-air flows are the temperature, density and velocity of both the cooling air and the hot gas. For example, the blow-out rate, which reflects the product of velocity and density of both the cooling air and the hot gas, is approximately 1.5.

The apparatus for the implementation of the method in accordance with the present invention comprises a casing section that blocks the further transport of cooling air in the axial direction towards the labyrinth, this casing section being an extension of the inner casing of the turbine or the platform of the stator blades, protruding downstream beyond the stator blades and connecting to the turbine casing. In this casing section, cooling air passages for the generation of the cooling-air flows are provided upstream of the rotor blades which are orientated towards the hot-gas flow at a specific, radially and circumferentially related angle.

The method and the corresponding cooling apparatus according to the present invention, provide for effective, passive cooling of the outer shrouds of the rotor blades, thus decreasing the thermal stresses in the shrouds and increasing their fatigue strength. Despite the high effectiveness of cooling, the cooling air requirement is lower than that of known passive shroud cooling arrangements, as a result of which, thermodynamic effectiveness is increased.

BRIEF DESCRIPTION OF THE DRAWINGS

An example of the present invention is further explained in light of the accompanying drawing. In the only figure, the design of the high-pressure turbine in the area of a stator blade and a rotor blade for the passive cooling of the rotor blade outer shroud is schematically shown in longitudinal section.

DETAILED DESCRIPTION OF THE INVENTION

Figure 1:
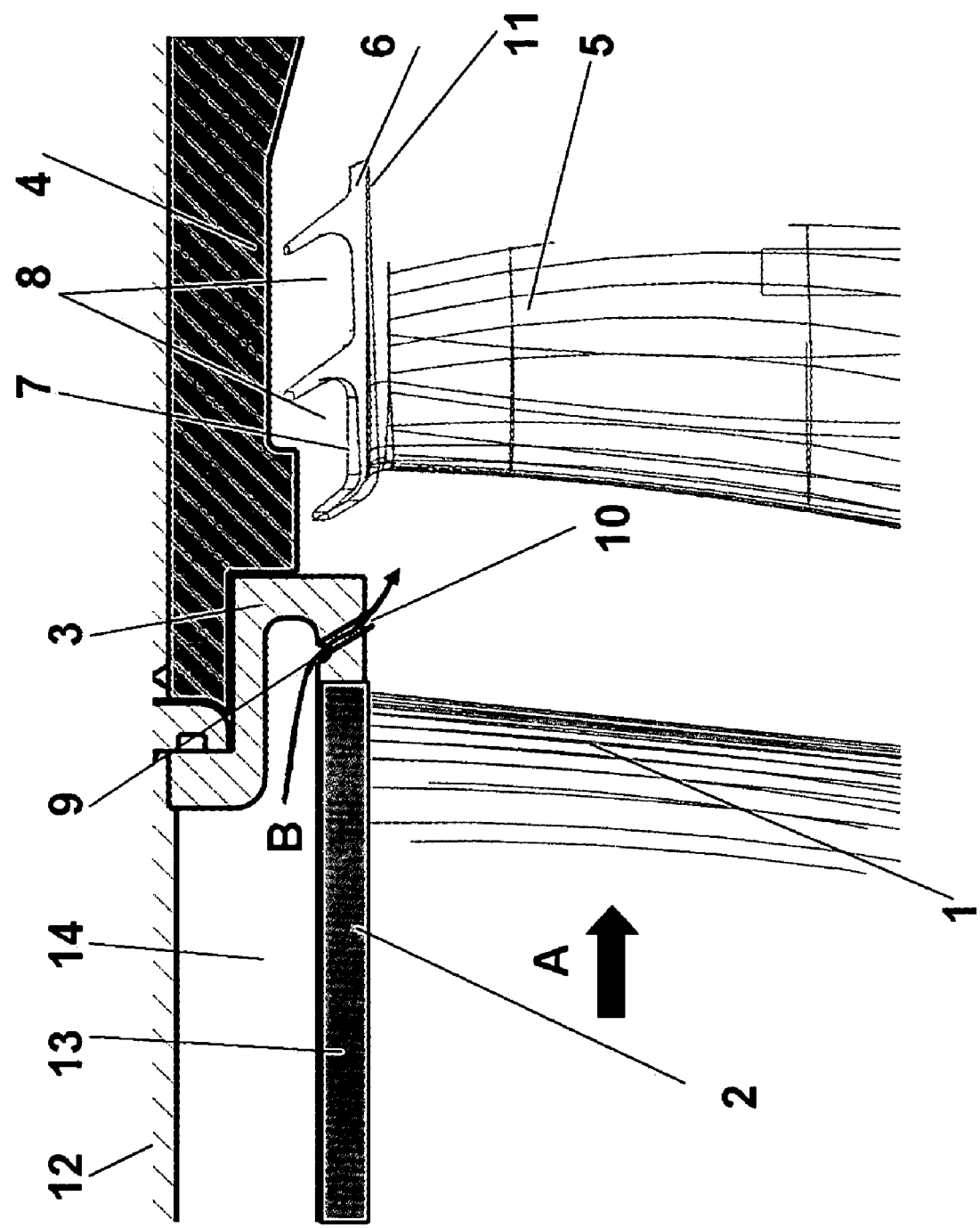

The platforms 2 provided at each of the outer edges of the stator blades 1 are extended by a casing section 3 protruding downstream beyond the stator blades 1 (or a corresponding platform protrusion) which is part of an inner casing 13 arranged in an outer casing 12. The protruding casing section 3, in the downstream direction, directly connects to the outer casing section of the turbine formed by a liner 4, as a result of which the further transport of cooling air in the space 14 formed between the turbine casing 12 and the inner casing 13 is interrupted in the axial direction. Arranged downstream of the stator blades 1 are the rotor blades 5 whose outer edges are each provided with an outer shroud 6 opposite the liner 4. The outer surface 7 of the shroud 6 is such that a labyrinth seal 8 is created between this surface and the liner 4.

In the protruding casing section 3 connecting to the platforms 2 or the inner casing 13, respectively, several cooling air passages 9 are provided one behind the other in a row in turbine circumferential direction whose exits 10 issue immediately into the hot-gas flow (arrow A) downstream of the stator blades 1 and upstream of the rotor blades 5. Since the casing section 3 directly connects to the inner casing formed by the liner 4:, an immediate supply of cooling air (in axial direction) to the labyrinth seal 8 is not possible. The cooling air passages 9 are orientated such in the protruding casing section 3 that the cooling air supplied by the compressor between the turbine casing 12 and the inner casing 13, 3 is issued in a certain direction into the hot-gas flow in the form of individual cooling air flows (arrow B) such that it will remain below the separating flow line between the hot-gas flow remaining in the annulus and the hot-gas flow in the area of the labyrinth seal and enter the hot-gas flow to such an extent that the major part of the cooling air reaches the bottom, thermally highly loaded surface 11 of the shroud 6, essentially covering and uniformly cooling the whole surface 11. This means that the cooling air passages 9 are orientated in the wall of the protruding casing section 3 at a radial angle of 20°, for example, relative to the outer casing 12 of the turbine and at the outlet angle of the stator blades 1, for example at a tangential (circumferentially related) angle of 64°.

Both the angular orientation (angular position) of the cooling air passages 9, i.e. the position defined by a tangential (circumferential) and a radial angle and the axial position of the cooling air passages 9, i.e. their location closer to the stator blades or closer to the rotor blades, as well as their cross-sectional area, are variable and depend on the aerodynamic characteristics of the turbine stage and the shroud geometry.

The radial angle can range between 15° and 90°, and any range therein, measured from a line extending downstream parallel to the turbine axis. The tangential/circumferential angle can vary between −85° and +85°, and any range therein, measured from a radial plane containing the turbine axis. Hence, when at a radial angle of 90°, and a tangential/circumferential angle of 0°, the cooling air passage is oriented exactly radially. Further important parameters controlling the entry of cooling air into the hot-gas flow and its routing primarily to the highly loaded bottom surface 11 of the shroud 6 are the velocity, the temperature and the density of both the cooling air and the hot gas. The design parameters specified above are selected, or adjusted, such that the impulse of the individual cooling-air flows ensures that the cooling-air flows impinge on the bottom surface 11 of the respective shroud 6, with low mixing losses occurring between the cooling air and the hot gas. The preferred blowout rate, i.e. the relation of the products of density and velocity of both the cooling air and the hot gas $\rho \cdot u_{cooling\ air}/\rho \cdot u_{hot\ gas}$, is 1.5.

The defined introduction of the cooling-air flows into the hot-gas flow at an angular orientation controlled by the aerodynamic characteristics and the shroud geometry, together with adequate cooling of the shroud top side, provides, in particular, for uniform, complete cooling of the thermally highly loaded bottom surface of the shroud 6 facing the rotor blade 5, in particular, also on the suction side of the rotor blade 5. This results in reduced thermal stresses in the shroud and, consequently, in increased fatigue strength. Although the cooling air quantity for the cooling of the shroud bottom surface is introduced completely into the hot-gas flow, cooling air losses are the same as with the known methods for passive shroud cooling mentioned above. The high cooling effectiveness of the method according to the present invention enables the required cooling air quantity to be reduced by approx. 30 percent, thus increasing the thermodynamic effectiveness, with the aerodynamic effectiveness remaining unchanged.

The claimed invention is applicable to aircraft gas turbine engines and to industrial, marine or heavy duty gas turbines.

LIST OF REFERENCE NUMERALS

1 Stator blade
2 Platform
3 Protruding casing section (Platform protrusion)
4 Liner (inner casing)
5 Rotor blade
6 Outer Shroud
7 Outer surface of 6
8 Labyrinth seal
9 Cooling air passages
10 Exits
11 Bottom surface (inner surface) of 6
12 Turbine casing
13 Inner casing
14 Space between 12 and 13
Arrow A Hot-gas flow
Arrow B Cooling air flow

What is claimed is:

1. A method for the cooling of outer shrouds of rotor blades of a gas turbine which are subject to a hot-gas flow downstream of stator blades of the gas turbine and which are passively cooled with cooling air supplied by a compressor via a turbine casing, comprising: introducing a multitude of cooling-air flows distributed equally on a circumference of a respective turbine stage downstream of the stator blades directly into the hot-gas flow in a defined direction, wherein the cooling-air flows, in dependence of applicable aerodynamic and geometrical conditions, are positioned and angularly orientated such that the cooling air primarily and essentially hits substantially all of a bottom surface of the outer shrouds of the rotor blades; wherein a blow-out rate, as a quotient of a product of density and velocity of both the cooling air and the hot gas, is approximately 1.5.

2. A method in accordance with claim 1, wherein the cooling-air flows are introduced into the hot-gas flow at a tangential, circumferentially related angle corresponding to an outlet angle of the stator blades and at a radial angle which is acute.

3. A method in accordance with claim 2, wherein the cooling-air flows, in dependence of the aerodynamic and geometrical conditions in the respective turbine stage, are introduced into the hot-gas flow in an angular position which ranges from −85° to +85° circumferentially and from 15° to 90° radially.

4. A method in accordance with claim 3, wherein the cooling-air flows are introduced into the hot-gas flow at a certain angle in dependence of a temperature, density and velocity of both the cooling-air flows and the hot-gas flow, so that the cooling air reaches the bottom surface of the outer shrouds with low losses.

5. A method in accordance with claim 1, wherein the cooling-air flows, in dependence of the aerodynamic and geometrical conditions in the respective turbine stage, are introduced into the hot-gas flow in an angular position which ranges from −85° to +85° circumferentially and from 15° to 90° radially.

6. A method in accordance with claim 1, wherein the cooling-air flows are introduced into the hot-gas flow at a certain angle in dependence of a temperature, density and velocity of both the cooling-air flows and the hot-gas flow, so that the cooling air reaches the bottom surface of the outer shrouds with low losses.

7. An apparatus for cooling outer shrouds of rotor blades of a gas turbine positioned in a hot-gas flow downstream of stator blades of the gas turbine, comprising:
   an air space positioned between an outer casing and an inner casing which is supplied with cooling air;
   a casing section protruding downstream beyond the stator blades which is connected to the outer casing and interrupts a further movement of cooling air in the air space in the axial direction,
   a plurality of circumferentially distributed cooling air passages positioned in the casing section through which the cooling air can flow upstream of the rotor blades and, in dependence of the aerodynamic and geometrical conditions in the turbine stage, each cooling air passage being orientated at a radially and circumferentially related angle such that the cooling-air flows passing through the cooling air passages enter the hot-gas flow and reach bottom surfaces of the shrouds; wherein the cooling air passages are configured, arranged and sized to provide a blow-out rate, as quotient of a product of density and velocity of both the cooling air and the hot gas, of approximately 1.5.

8. An apparatus in accordance with claim 7, wherein the cooling air passages are orientated at a radial angle between 15° and 90° and at a tangential angle between −85° and +85°.

9. An apparatus in accordance with claim 7, wherein the cooling air passages are located closer to the suitor blades than the rotor blades.

10. An apparatus in accordance with claim 7, wherein the cooling air passages are located closer to the rotor blades than the stator blades.

11. An apparatus in accordance with claim 7, wherein the casing section comprises stator blade platforms.

12. An apparatus for cooling outer shrouds of rotor blades of a gas turbine positioned in a hot-gas flaw downstream of stator blades of the gas turbine, comprising:
   an air space positioned between an outer casing and an inner casing which is supplied with cooling air;
   a casing section protruding downstream beyond the stator blades which is connected to the outer casing and interrupts a further movement of cooling air in the air space in the axial direction,
   a plurality of circumferentially distributed cooling air passages positioned in the casing section through which the cooling air can flow upstream of the rotor blades and, in dependence of the aerodynamic and geometrical conditions in the turbine stage, each cooling air passage being orientated at a radially and circumferentially related angle such that the cooling-air flows passing through the cooling air passages enter the hot-gas flow and reach bottom surfaces of the shrouds, wherein the cooling air passages are located closer to the stator blades than the rotor blades.

13. An apparatus in accordance with claim 12, wherein the cooling air passages are orientated at a radial angle between 15° and 90° and at a tangential angle between −85° and +85°.

14. An apparatus in accordance with claim 12, wherein the casing section comprises stator blade platforms.

15. A method for the cooling of outer shrouds of rotor blades of a gas turbine which are subject to a hot-gas flow downstream of stator blades of the gas turbine and which are passively cooled with cooling air supplied by a compressor via a turbine casing, comprising: introducing a multitude of cooling-air flows distributed equally on a circumference of a respective turbine stage downstream of the suitor blades directly into the hot-gas flow in a defined direction, wherein the cooling-air flows, in dependence of applicable aerodynamic and geometrical conditions, are positioned and angularly orientated such that the cooling air primarily and essentially hits substantially all of a bottom surface of the outer shrouds of the rotor blades, wherein the cooling air passages are positioned closer to the stator blades than the rotor blades.

16. A method in accordance with claim 15, wherein the cooling-air flows are introduced into the hot-gas flow at a tangential, circumferentially related angle corresponding to an outlet angle of the stator blades and at a radial angle which is acute.

17. A method in accordance with claim 16, wherein the cooling-air flows, in dependence of the aerodynamic and geometrical conditions in the respective turbine stage, are introduced into the hot-gas flow in an angular position which ranges from −85° to +85° circumferentially and from 15° to 90° radially.

18. A method in accordance with claim 15, wherein the cooling-air flows, in dependence of the aerodynamic and geometrical conditions in the respective turbine stage, are introduced into the hot-gas flow in an angular position which ranges from −85° to +85° circumferentially and from 15° to 90° radially.

19. A method in accordance with claim 15, wherein the cooling-air flows are introduced into the hot-gas flow at a certain angle in dependence of a temperature, density and velocity of both the cooling-air flows and the hot-gas flow, so that the cooling air reaches the bottom surface of the outer shrouds with low losses.

* * * * *